United States Patent [19]

Ringel et al.

[11] Patent Number: 4,816,041

[45] Date of Patent: Mar. 28, 1989

[54] PROCESS AND INSTALLATION FOR THE ADSORPTIVE SEPARATION OF KRYPTON FROM A KRYPTON NITROGEN GAS MIXTURE

[75] Inventors: Helmut Ringel, Niederzier-Hambach; Wolfgang Frommelt, Linnich-Rurdorf; Kurt Hein, Julich; Martin Messler, Cologne, all of Fed. Rep. of Germany

[73] Assignee: Kernforschungsanlage Julich Gesellschaft mit beschrankter Haftung, Julich, Fed. Rep. of Germany

[21] Appl. No.: 735,378

[22] Filed: May 17, 1985

[30] Foreign Application Priority Data

May 22, 1984 [DE] Fed. Rep. of Germany ....... 3429736
Aug. 13, 1984 [DE] Fed. Rep. of Germany ....... 3418972

[51] Int. Cl.$^4$ ............................................. B01D 53/04
[52] U.S. Cl. ........................................... 55/62; 55/66; 55/74; 55/75
[58] Field of Search ................... 55/25, 26, 58, 59, 62, 55/66, 74, 75, 179, 387, 389

[56] References Cited

U.S. PATENT DOCUMENTS

| | | | |
|---|---|---|---|
| 1,906,917 | 5/1933 | Peters et al. | 55/66 X |
| 2,793,507 | 5/1957 | Hnilicka | 55/66 X |
| 3,063,217 | 11/1962 | Armond et al. | 55/66 X |
| 3,121,625 | 2/1964 | Broughton | 55/58 |
| 3,164,454 | 1/1965 | Wilson | 55/58 X |
| 3,176,444 | 4/1965 | Kiyonaga | 55/58 X |
| 3,488,921 | 1/1970 | Inchauspe | 55/66 |
| 3,922,150 | 11/1975 | Yusa et al. | 55/66 X |
| 3,963,460 | 6/1976 | Stumpf et al. | 55/66 |
| 3,971,640 | 7/1976 | Golovko | 55/66 |
| 4,054,427 | 10/1977 | Schroeter et al. | 55/66 X |
| 4,093,429 | 6/1978 | Siegler et al. | 55/66 X |
| 4,283,367 | 8/1981 | Koeppe et al. | 55/66 X |
| 4,314,828 | 2/1982 | Saito et al. | 55/66 X |
| 4,369,048 | 1/1983 | Pence | 55/66 |

Primary Examiner—Robert Spitzer
Attorney, Agent, or Firm—Scully, Scott, Murphy & Presser

[57] ABSTRACT

A process and installation for the adsorptive separation, in an adsorption column, of krypton from a gas mixture containing, in particular, nitrogen in addition to the krypton. The adsorption column is filled with an adsorption medium which adsorbs krypton and nitrogen over a length L extending in the direction of the inflowing gas mixture. After the adsorption of the gas components in the adsorptive column, the adsorption medium is desorbed in the following process step through the intermediary of a gaseous scavenging medium. The scavenging medium flows through the adsorption column in the same direction in which the gas mixture was introduced into the adsorption column during the first process step. The adsorption medium is charged with krypton commencing from the gas inlet of the adsorption column over only such a partial length $L_O$ of the entire column length L, that during the desorption of the adsorption column with the scavenging medium there is separately removable from each other at the gas discharge of the adsorption column, initially only nitrogen, and later on krypton.

5 Claims, 5 Drawing Sheets

PROCESS AND INSTALLATION FOR THE ADSORPTIVE SEPARATION OF KRYPTON FROM A KRYPTON NITROGEN GAS MIXTURE

BACKGROUND OF THE INVENTION

1. Field of the Invention

The present invention relates to a process and installation for the adsorptive separation, in an adsorption column, of krypton from a gas mixture containing, in particular, nitrogen in addition to the krypton. The adsorption column is filled with an adsorption medium which adsorbs krypton and nitrogen over a length L extending in the direction of the inflowing gas mixture. After the adsorption of the gas components in the adsorption column, the adsorption medium is desorbed in a following process step through the intermediary of a gaseous scavenging medium. The scavenging medium flows through the adsorption column in the same direction in which the gas mixture was introduced into the adsorption column during the first process step.

Above all, it is necessary to carry out the separation of krypton from a gas mixture is from the waste gas of a reconditioning installation for spent nuclear fuel elements because of the radiation activity of the krypton isotope Kr-85, which is released during the reconditioning of the nuclear fuel. The krypton isotope Kr-85 is a $\beta$-radiation emitter having half-life of 10.7 years and is contained in the krypton isotope mixture as a constituent of 7% by volume. For krypton which is present as an inert gas, only physical dissociation or separating processes are available, of which there are preferably adapted those with the adsorption of the krypton by adsorptive media, such as activated charcoal or molecular sieves, due to their assured and dependable mode of functioning for the reconditioning of nuclear fuels. The reconditioning of nuclear fuels necessitates the operation with the hot-cell technology; in effect, in chambers which are screened against the egress of radioactive emission and the operating procedures can be only carried out by remote control or through mechanical manipulators. Consequently, sought after in the technology is a simple handling of the adsorption installations.

Contained in the waste gas of a reconditioning installation, in addition to krypton and nitrogen, with the last-mentioned being a constituent of the air which is introduced into the reconditioning installation, are gas constituents such as $NO_x$, aerosols, iodine, steam, and oxygen. As a result thereof, prior to effecting the krypton separation must be prepurged the waste gas such that, initially, there are separated out the $NO_x$ constituents, aerosols, and iodine, subsequently the remaining $NO_x$, steam, as well as finally xenon. The remaining waste gas possesses krypton at a proportion of about 0.1% by volume, and essentially nitrogen at a proportion of 80% by volume. From this gas mixture there should be recovered krypton extensively isolated in order to reduce as much as possible the residual volume which is to be stored away. The contamination of the krypton which is to be stored away; for instance, through residual constituents of nitrogen, oxygen, xenon, should in its entirety constitute no higher than 10% by volume.

2. Discussion of the Prior Art

It is known from the disclosure of German Patent No. 22 10 264, that there can be employed an adsorption column filled with activated charcoal from the adsorptive separation of krypton, and which is charged with krypton up to the escape or discharge of krypton. The adsorbed krypton is recovered from the adsorption column through a combined vacuum and scavenging gas desorption. In this process, disadvantageous, on the one side, is the time-consuming pumping phase which is required for desorption, as well as, on the other side, the relatively low enrichment factors which are attained in the scavenging gas for krypton during the desorption of the column. A similar separating process with adsorption and desorption under temperature and pressure change is described in the specification of German Laid-Open patent application No. 26 55 936. In this process, the inert gases constituted of krypton and xenon are always commonly separated out in an adsorption column.

From the disclosure of German Laid-Open patent application 2 326 060 there is known a process for the continual separation of krypton, in which the adsorption medium travels through a cooled adsorption chamber which is streamed through by the waste gas, and thereafter a heated desorption chamber which frees the adsorbed gas constituents. The desorbed inert gases of krypton and xenon are separated in a rectisorption section. The attainable separating yield in this process depends quite extensively upon the adsorptive properties of the adsorption medium.

Another adsorption process which is described in an International patent application, which was published by the German Patent Office under No. DE 30 49 761 A1, is also quite complex. In this process, by means of sequential process stages with each having at least two adsorption columns, there are separated from the waste gas in sequence, at first the xenon, thereafter the oxygen, and finally krypton, so that pure nitrogen will then remain at the end of the adsorption steps. In order to carry out this process there are exclusively employed, over a part, specially prepared molecular sieves.

A high degree of enrichment of the krypton in the gas mixture which is to be scavenged, and a separation through the intermediary of gas chromatography is known from the disclosure of German Laid-Open patent application 32 14 825. Sought after is a further simplification in the separation or dissociation of krypton from the waste gas.

SUMMARY OF THE INVENTION

Accordingly, it is an object of the present invention to provide a process for the separation of krypton from a gas mixture which, in addition to krypton, essentially contains nitrogen, wherein through a simple application of the process, there can be achieved a high separating yield, and a large portion of the entire gas separating process can also be carried out externally of hot or thermal cells.

The foregoing object, pursuant to the present invention, is achieved in a process of the above-mentioned type in that the adsorption medium is charged with krypton commencing from the gas inlet of the adsorption column over only such a partial length $L_0$ of the entire column length L, that during the desorption of the adsorption column with the scavenging medium, there is separately removable from each other at the gas discharge of the adsorption column, initially only nitrogen, and latter on krypton. The adsorption column is filled with the gas mixture in a manner such that the adsorption medium is only partially charged with krypton, and with consideration being given to the diffusion speeds of the adsorbed krypton and nitrogen, during the desorption of the adsorption column with scavenging gas there is initially withdrawable only nitrogen, and later on, krypton from the gas discharge of the adsorption column. The diffusion speeds of the adsorbed materials are essentially dependent upon the temperature, upon the kind of the adsorption medium and upon the velocity of the scavenging gas. Obtained for the diffusion speeds of krypton $v_{Kr}$ and of nitrogen $v_N$ in the adsorption medium are values of $v_{Kr} < v_n$. The adsorption column is more rapidly diffused through by nitrogen during desorption than it is by krypton. Commencing from this differential between the traveling or diffusing speeds, for an adsorption column which, as already indicated, is filled with adsorption medium over a length L as viewed in the direction of flow of the gas mixture or of the scavenging gas, there is prescribed a maximum charging capability with krypton over a partial length $L_0$, which is so measured that the nitrogen has already exited from the adsorption column before the krypton appears at the discharge of the column. The partial length $L_0$ is determined experimentally.

When the adsorption medium in the adsorption column is then charged with krypton up to a partial length $L_0$, and subsequently desorbed with scavenging gas, then at the end of the adsorption column there initially exits the entire adsorbed nitrogen with the scavenging gas, and subsequently thereto the krypton with the scavenging gas.

The charging of the adsorption column with krypton up to the permissible partial length $L_0$ is preferably carried out through filling of the adsorption column with the gas mixture at a closed gas discharge and through a pressure increase up to a pregiven gas pressure. Upon reaching of the pregiven gas pressure, the inlet of gas mixture is closed off, and subsequently for effecting desorption of the adsorbed gas constituents, scavenging is effected under an opened gas discharge, whereby scavenging gas with nitrogen is initially conducted into a nitrogen conduit, and subsequently scavenging gas with krypton into a krypton conduit, from the gas discharge. The maximum settable gas pressure of the gas mixture during the charging of the adsorption column is experimentally determinable through the maximum chargeability of the adsorption column with krypton up to the partial length $L_0$. For the case, wherein during the technical application of the limiting conditions which must be considered, will not allow for a setting of the necessary maximum gas pressure for the filling of the adsorption column, it is possible by means of a partial opening of the gas discharge, to introduce such an extent of gas mixture into the adsorption column, that the adsorption medium is charged with the krypton up to the pregiven partial length $L_0$ of the adsorption column. A charging of the adsorption column in the above-described manner through the setting of a pregiven gas pressure is advantageously preferably implementable at room temperature. Should the waste gas throughput be increased, and the helium throughput be reduced, then this can be achieved through the cooling of the adsorption column during the charging procedure. The adsorption column is desorbed under a pressure which is lower than the gas pressure during the charging. It is practical to empty the adsorption column under atmospheric pressure. Hereby, there can also be operated at room temperature. A more rapid desorption is achieved through heating of the adsorption medium.

Coming into consideration as scavenging gases are inert gases or equivalent gases, which will not chemically react with the constituents of the gas mixture. Preferably, the adsorption column is desorbed with helium, for instance, inasmuch as helium and krypton will allow themselves to be separated in a simple manner through the freezing out of the krypton. In order to render it unnecessary to completely purge the adsorption column of adsorbed krypton prior to the renewed filling with the gas mixture which is to be dissociated, upon the renewed charging of the adsorption column there can be interchanged gas inlet and gas discharge thereof, so that the gas mixture which is presently conducted into the adsorption column will flow into the adsorption column at the location from which the desorbed scavenging gas-krypton mixture was previously withdrawn. The krypton which is still present at this location of the adsorption column after the desorption, is thereby carried out during the subsequent separating process.

Adapted for the implementation of the inventive process is an adsorption column possessing the following characteristics: Proceeding from the known values of $v_{Kr}$ = the diffusion speed of the krypton during desorption of the scavenging gas, $v_N$ = the diffusion speed of the nitrogen during desorption with scavenging gas, $L_0$ = the partial length of the adsorption column which is charged with krypton during a closed gas discharge of the adsorption column; $L_0$ is dependent upon the gas pressure, the type and the temperature of the adsorption medium; there is then obtained for the length L of the adsorption column which is filled with the adsorption medium, the following approximation:

$$L \geq \frac{L_0}{1 - \frac{v_{Kr}}{v_N}}$$

In order to increase the adsorptive capacity of the adsorption medium, in order to reduce the volume of the adsorption sections and to achieve a reduction in the scavenging flow, and to generally reduce the hot-cell space which must be made available for the separation or dissociation of xenon and krypton, there is employed the considerable adsorptive capability of the adsorption medium at low temperatures. The first of the adsorption sections, which is provided for the restraining of the xenon, is cooled down to a temperature of $-130°$ C., the second adsorption section which is determined for the adsorption of krypton is set to a temperature within the temperature range of $-150°$ C. to $-180°$ C. The temperature of $-130°$ C. for the first adsorption section is the lowest temperature for the adsorption of xenon, inasmuch as below the mentioned temperature the concurrent adsorption (coadsorption) of krypton in the first adsorption section becomes so extensive as to adversely affect the desired xenon-krypton separation, since the desorbed xenon after the warming up of the adsorption section is strongly contaminated with krypton. The lowest temperature which can be set in the second adsorption column for the krypton adsorption is dependent upon the oxygen constituent in the gas mixture. The coadsorbing oxygen reduces the adsorptive capacity for the krypton. The less oxygen there is contained in the gas mixture, the lower can there be selected the temperature, and can there be utilized the increasing adsorptive capacity of the adsorption medium. The first adsorption section is only partially charged with xenon, and the second partially charged with krypton, in order to achieve a separation or dissociation between the air constituents, krypton, and xenon during the desorption. For desorption, pursuant to the invention, both adsorption columns are heated stepwise under the infeed of scavenging medium. Hereby, it is important to the first heating phase, to set a desorption temperature in which the different diffusion speeds of the air constituents, krypton, and xenon in the adsorption medium stand at such an interrelationship, that at the gas discharge of the second adsorption section there can be initially withdrawn the desorbed air constituents and thereafter the highly enriched krypton. When krypton appears at the gas discharge, both adsorption sections are further heated whereby, subsequent to the withdrawal of krypton from the second adsorption section, xenon will finally flow out. For the desorption of xenon it is expedient to employ a temperature of higher then 80° C.

An optimum application of the process during the separation of krypton from the gas mixture is achieved during desorption when, up to the escape of krypton, the temperature in the first adsorption column is no higher than $-20°$ C., and is set in the second adsorption column as not higher than $-50°$ C. At this temperature level, there can be withdrawn at the gas discharge of the second adsorption column, subsequent complete desorption of nitrogen and oxygen, only very slightly contaminated krypton.

When the speed of heating up to krypton escape at the gas discharge of the second adsorption section is so set that a level temperature profile forms itself in the adsorption medium, there results an extremely uniform desorption of the adsorbates, which leads to uncontaminated end products.

An economical implementation of the process is obtained through the utilization as a cooling medium for the first adsorption section by the purified gas mixture which flows off during the adsorption phase from the gas discharge of the second adsorption section. Merely the second adsorption section need then be cooled to the adsorption temperature with further cooling media, such as liquid nitrogen.

BRIEF DESCRIPTION OF THE DRAWINGS

Reference may now be had to the following detailed description of the inventive process and advantageous embodiments of the adsorption column, on the basis of various exemplary embodiments thereof, taken in conjunction with the accompanying drawings; in which.

DETAILED DESCRIPTION

Figure 1:
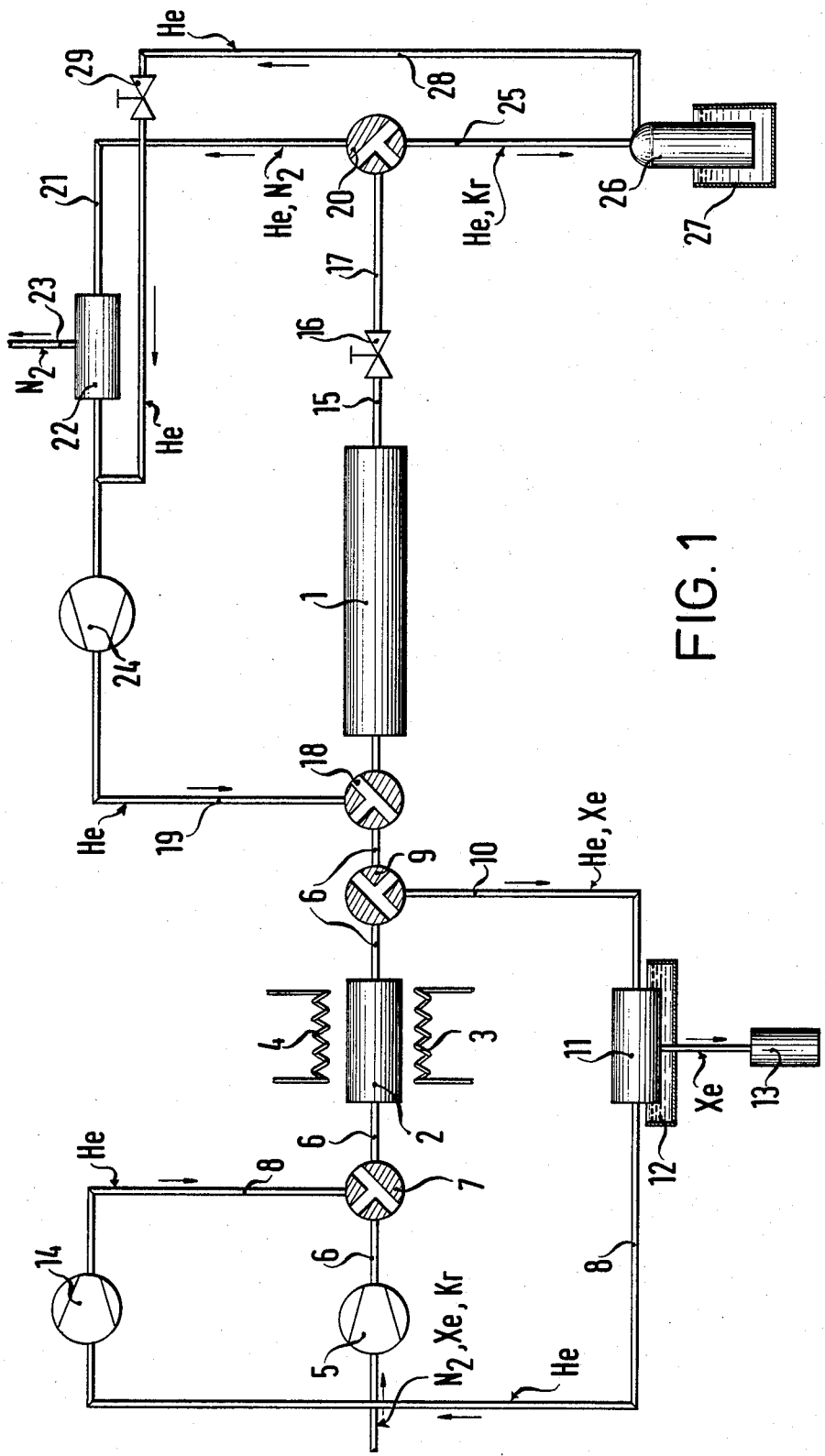
FIG. 1 illustrates a schematic flow diagram of an adsorption routing section for the separation of xenon and krypton.

As schematically illustrated in FIG. 1 of the drawings, there are shown the necessary connections for an adsorption column 1 for krypton separation with a xenon separator 2 connected ahead thereof. In the illustrated embodiment, the xenon separator also operates adsorptively. Utilized as the adsorptive medium is activated charcoal. The adsorptive medium in the xenon separator can be cooled during the adsorption phase through the intermediary of a cooling arrangement 3 to below room temperature; whereas for an acceleration of the desorption, a heating arrangement 4 can be switched in for heating of the adsorption medium.

The xenon separator has conducted thereto the gas mixture which is to be scavenged, which essentially contains nitrogen with minor constituents of xenon and, through the application of a membrane pump 5. The membrane pump 5, the xenon separator 2, and the adsorption column 1 are connected in series through an inlet 6 for the gas mixture along the direction of flow of the gas mixture. Arranged in the inlet 6, intermediate the membrane pump 5 and the xenon separator 2, is a switchable three-way valve 7, through which, instead of the gas mixture which is to be scavenged, after the adsorption of the xenon in the xenon separator 2, helium can be introduced as the scavenging gas for desorption from a scavenging gas conduit 8 into the xenon separator 2. During the desorption of the xenon separator 2, a three-way valve 9 arranged downstream of the inlet 6 in the xenon separator is switched over in a manner such that the scavenging gas flow with desorbed xenon flows through a xenon conduit 10 to a cooling trap 11 with a cooling bath 12 which is filled with liquid nitrogen. In the cooling trap 11, the xenon is again separated from the scavenging gas. The xenon-free scavenging gas is reconveyed in a closed circuit from the outlet of the cooling trap 11 to the scavenging gas conduit 8, and the obtained xenon is filled into suitable storage containers 13. For affecting the scavenging gas flow in a closed circuit, there is provided a membrane pump 14 which, in the exemplary embodiment, is inserted in the scavenging gas conduit 8.

The adsorption column 1 which is to be streamed through by the gas mixture which is to be scavenged subsequent to the separating out of the xenon, and within which there is restrained the krypton, is filled with activated charcoal forming the adsorption medium. In lieu of activated charcoal there can also be employed molecular sieves, such as zeolites. For charging of the adsorptive column 1 with krypton, a shutoff valve 16 can be closed at the discharge 15 of the adsorption column. In the illustrated embodiment, the shutoff valve 16 opens into a discharge conduit 17 which is connected to the discharge 15. The charging of the adsorption column 1 is effected under a pressure increase with a closed shutoff valve 16. The final pressure of the adsorption column is so selected that, during the subsequent desorption step, at the discharge 15 of the adsorption column there will initially escape only scavenging gas with nitrogen; thereafter scavenging gas with krypton. This is explained in further detail hereinbelow in connection with FIGS. 2 and 3 of the drawings.

The adsorption column 1 is desorbable, using helium as the scavenging gas, in the same manner as is the xenon separator 2. For this purpose, upstream of the adsorption column 1, there is arranged in the inlet 6 viewed in the direction of flow of the gas mixture, a further three-way valve 18 downstream of the three-way valve 9, by means of which helium is introducable from a scavenging gas conduit 19 into the adsorption column 1. When scavenging gas is introduced into the adsorption column after the adsorption phase, then the initially withdrawn scavenging gas-nitrogen mixture flows through a three-way valve 20 and a connecting conduit 21 to a gas scrubber 22, from which there can be separately withdrawn nitrogen and purified helium. The nitrogen is conducted off in a nitrogen conduit 23, the recovered helium is reutilized as scavenging gas and reconveyed into the scavenging gas conduit 19. A membrane pump 24 serving for the closed circulation of scavenging gas is arranged in the scavenging gas conduit 19.

Following the scavenging gas-nitrogen mixture, the scavenging gas-krypton mixture will flow out of the adsorption column 1. Immediately before this reaches the three-way valve 20 in the discharge conduit 19, is the valve 20 switched over. The scavenging gas-krypton mixture then flows through a krypton conduit 25 into a storage flask 26 for krypton, in which the krypton is separated from the scavenging gas through the cooling of the storage flask in a liquid nitrogen bath 27. Also the helium which has been recovered during the separation of the krypton can be reconveyed in the scavenging gas flow circuit. Serving this purpose is a return conduit 28, by means of which the helium is conveyed into the scavenging gas conduit 19 through the operation of the membrane pump 24. A shutoff valve 29 is arranged in the return conduit 28, which valve is opened during the withdrawal of purified scavenging gases from the storage flask 26.

Figure 2:
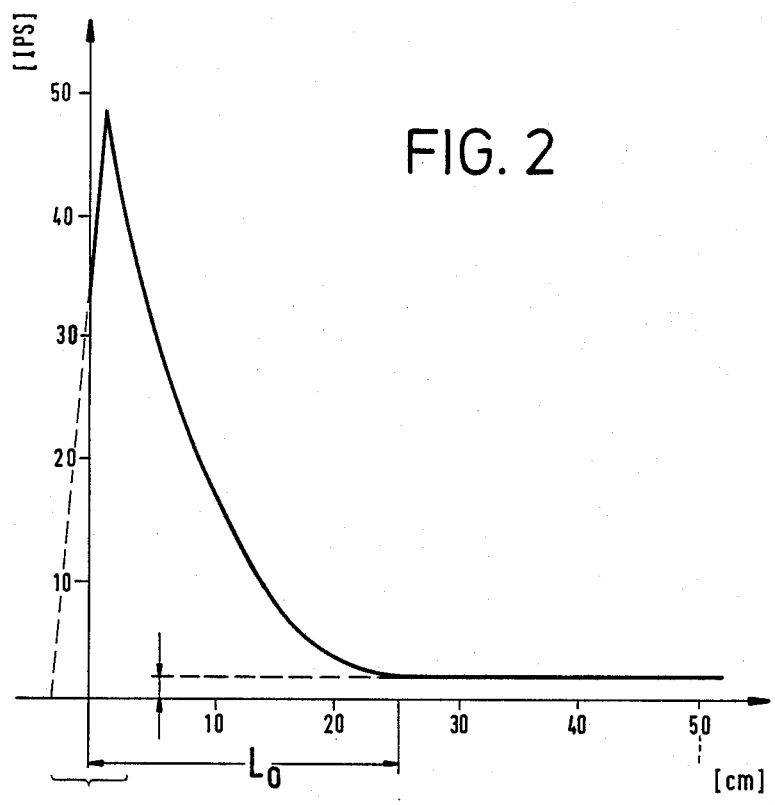
FIG. 2 illustrates a graphical representation of the charging with krypton over the length L of the adsorption column of FIG. 1.

In FIG. 2 of the drawing there is graphically illustrated the sequence of the krypton charging in the adsorption column 1, which in the illustrated embodiment possesses a column diameter of 2 cm, and which is filled over a length L of 50 cm with activated charcoal constituting the adsorption medium. From FIG. 2 there can be ascertained that the adsorption column is charged in a sawtooth shape with the krypton along its length L (indicated on the abscissa in the graph of FIG. 2), and krypton is absorbed by the adsorption medium only up to about one half of the length L of the adsorption column; in essence, up to a length $L_0$ of 25 cm. In order to be able to determine the adsorbed quantity of the krypton for each unit of length of the adsorption column, there are added to the gas mixture which is to be scavenged 0.6 millicurie of krypton-85 for each $dm^3$ of gas mixture. The quantity of krypton quantity held back by the adsorption medium could be determined as such by means of radiation measuring instruments, which were conveyed along the outer wall surface of the adsorption column 1. By means of the radiation measuring instruments there was counted the measured counting rate in pulses per sec (IPS). The counting rate is plotted in FIG. 2 along the ordinate of the graph.

The adsorption column 1 was charged with krypton together with the gas which was to be scavenged at a closed shutoff valve 16 under a pressure rise. The gas mixture streaming is essentially consisted of nitrogen with a krypton content of 0.1% by volume. From FIG. 2 there can be ascertained that the adsorption column was charged with krypton, as previously indicated, at a temperature of 22° C. and a pressure of 4.5 bar, up to about one-half thereof. This filling of the adsorption column, upon a following desorption with helium forming the scavenging gas, facilitated the separation or dissociation of nitrogen and krypton at the discharge 15 of the adsorption column 1. The achieved separation is illustrated by a chromatograph represented in FIG. 3.

Figure 3:
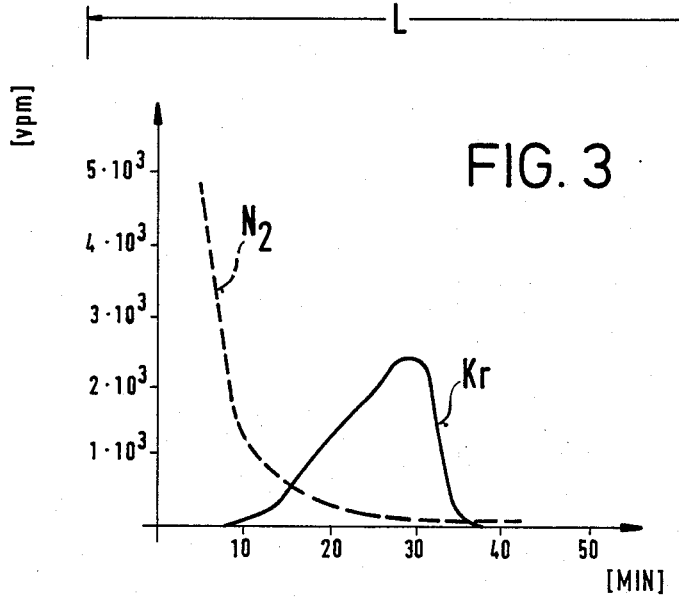
FIG. 3 illustrates a graphical representation of a chromatograph during the desorption of an adsorption column of FIG. 1 which is charged with krypton and nitrogen.

For discharging and desorption, the adsorption column was brought down to normal pressure; in effect, to a pressure of one atmosphere (Atm), and then scavenged with helium. In FIG. 3 there are entered the constituents of nitrogen and krypton in the scavenging gas during the scavenging period. Plotted in the chromatograph along the abscissa is the scavenging period in minutes (minutes), and along the ordinate the nitrogen and krypton constituents in the scavenging gas in vpm (volumetric parts per $10^6$).

From FIG. 3 there can be ascertained that from the adsorption column 1 there is initially conducted off only nitrogen with the scavenging gas only nitrogen; and only first after about a 10 minute scavenging period is there contained desorbed krypton in the rinsing gas. The krypton content in the scavenging gas rises constantly up to a content of about 2500 vpm after a scavenging period of about 30 minutes, and thereafter within a total scavenging period of about 45 minutes again drops down to about <vpm.

The three-way valve 20 at the end of the discharge conduit 17 is thereby to be switched over after passage of a scavenging period of 10 minutes, such that the krypton-containing scavenging gas can be transmitted through the krypton conduit 25 into the storage flask 26. Serving to maintain the therefore necessary pressure drop is the membrane pump 24 subsequent to the opening of the shutoff valve 29. The adsorption column 1 is desorbed after a scavenging period of about 45 minutes. After this time it is again capable of being charged. The cycle of the adsorption and desorption of the adsorption column, in the exemplary embodiment, consisted of about 2 hours.

An increase in the throughput of the gas mixture which is to be scavenged in the adsorption column can be achieved through a pressure increase during the adsorption phase. Moreover, through the cooling of the adsorption medium to a temperature which is below room temperature, there can be substantially increased quantity of krypton which is adsorbed by the adsorption medium.

Figure 4:
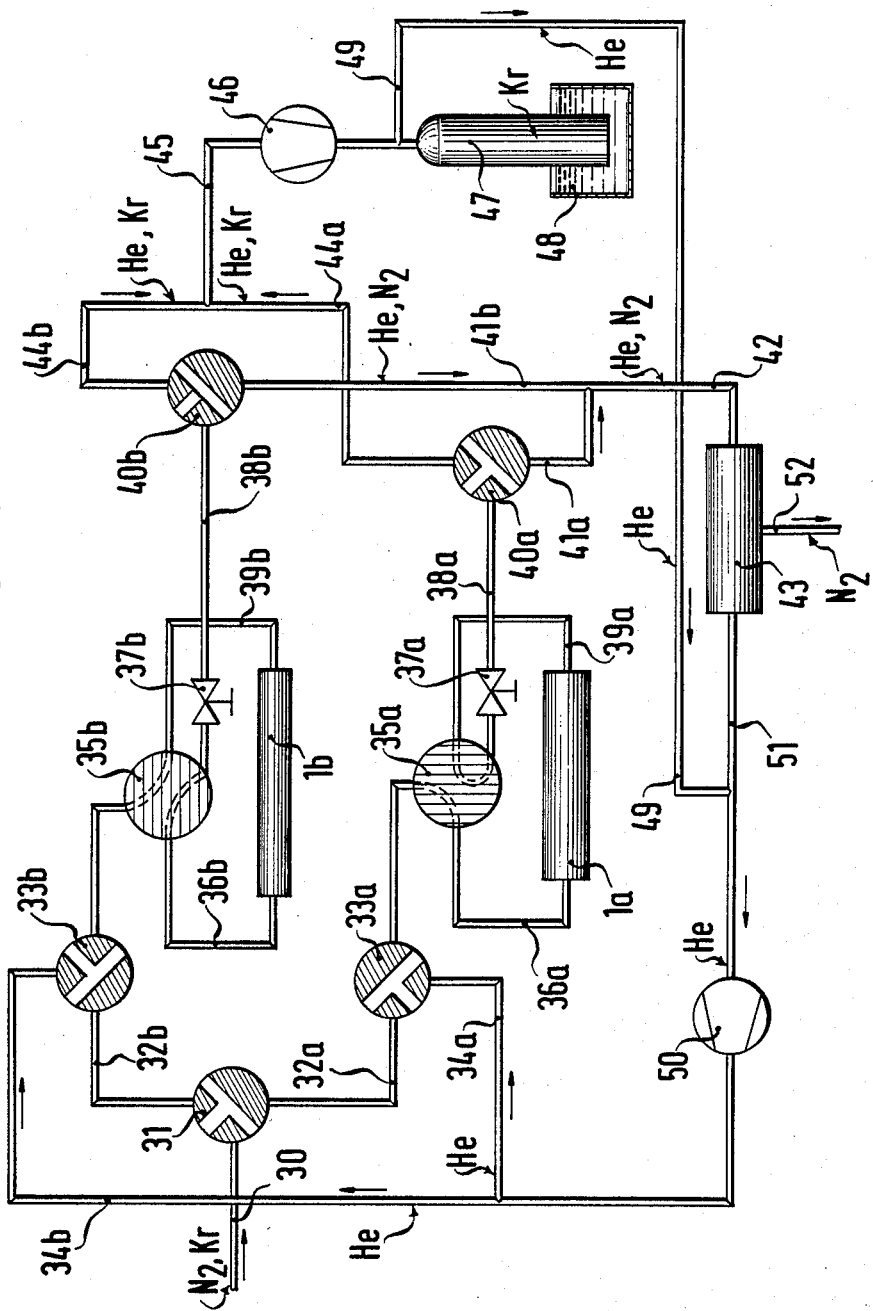
FIG. 4 illustrates a schematic flow diagram of an installation for the separation of krypton with alternating operation of a plurality of adsorption columns.

In FIG. 4 there is represented an installation for the quasi-continual separation or dissociation of krypton. TThe installation possesses two adsorption columns 1a, 1b, both of which are filled with activated charcoal in the same manner as in the embodiment of FIG. 1. The adsorption columns 1a, 1b are utilized in alternate operation, wherein during the time in which the one adsorption column is charged with krypton, the other column is desorbed employing helium as the scavenging gas. As xenon-free gas mixture flows into the installation through an inlet 30, which in addition to nitrogen contains small quantities of krypton. A xenon separator which, upon occasion, may be necessary for the gas which is to be scavenged, and, which would be connected upstream thereof, is not shown in FIG. 4.

A three-way valve 31 is located at the end of the inlet 30, which communicates with conduits 32a, 32b, through which the gas mixture to be scavenged is introducable into either the adsorption column 1a or the adsorption column 1b. Three-way valves 33a, 33b are, respectively, located in the conduits 32a, 32b, both of which valves are connected to scavenging gas conduits 34a, 34b and which conduct helium constituting the scavenging gas for the desorption of the adsorption columns 1a, 1b. The adsorption columns 1a, 1b are each respectively connected with a reversing valve 35a, 35b. These reversing valves serve the purpose of alternatingly charging the adsorption columns from different ends thereof. In FIG. 4, the reversing valve 35a is illustrated in a valve position in which the gas mixture which is to be scavenged is introduced into the adsorption column 1a through a column connector 36a. During the inflow of the gas mixture, the shutoff valve 37a in one discharge conduit 38 remains closed. When the column is filled with krypton, the three-way valve 33 is switched over, and at an unchanged valve position of the reversing valve 35a, helium is introduced as scavenging gas through the column connector 36a into the adsorption column 1a. Hereby, the shutoff valve 37a is opened, and the desorbed gas constituents in the helium are conveyed out through the discharge conduit 30a. When the adsorption column 1a is emptied, the reversing valve 35a is rotated into the position in which the reversing valve 35b is illustrated in FIG. 4. When the adsorption column 1a is now again charged, then the gas mixture which is to be scavenged from the krypton flows through a column connector 39a from the other end into the adsorption column 1a. The shutoff valve 37a is hereby again closed.

This alternating operation of the adsorption column, the one time filling through the column connector 36a and discharge of the scavenging gas with the desorbed gas constituents through the column connector 39a, and the other time charging the adsorption columns through the column connection 39a and discharging the scavenging gas with desorbed gas constituents through the column connector 36a, has the advantage that after the desorption of the adsorption columns, for instance any possible krypton residues remaining during the following adsorption-desorption cycle in the adsorption column, cannot contaminate the initially outflowing helium-nitrogen gas mixture during desorption, but are commonly conducted off with the helium-krypton gas mixture which is to be subsequently withdrawn. The krypton residues always remain in the adsorption medium after each desorption procedure in the proximity of the discharge of the adsorption column; and consequently are located during the subsequent adsorption phase in the region of the adsorption column in which there is adsorbed the krypton. This alternating operation of the adsorption columns reduces the demands which must be set on the degree of scavenging of the adsorption columns after desorption.

For the separation of krypton and nitrogen, the discharge conduit 38a opens into a three-way valve 40a through which, on the one hand, the scavenging gas which is already charged with the nitrogen is conducted through conduits 41a and 42 into a gas scrubber 43 and on the other hand, the scavenging gas which is charged with xenon, can flow off after switching over into a krypton conduit 44a and 45. A membrane pump 46 is located in the krypton, 45, by means of which the scavenging gas which is charged with krypton can be aspirated from the adsorption columns. The krypton is filled into a storage flask 47 in the same manner as in the exemplary embodiment 1. The storage flask 47 is cooled in a bath 48 which is filled with liquid nitrogen in a manner such that the krypton condenses within the storage flask. The hereby remaining gaseous helium is reconveyed through a return conduit 49 into the scavenging gas flow circuit. In order to maintain the scavenging gas flow, there is provided a membrane pump 50. The membrane pump also aspirates the helium which is covered in the gas scrubber 43. For this purpose, the membrane pump 50 is connected to a helium conduit 51 leading away from the gas scrubber, which opens into the return conduit 49.

In the exemplary embodiment, the gas scrubber 43 is cooled with liquid nitrogen. The nitrogen which is hereby separated as a condensate from the helium-nitrogen mixture, is conducted off through a nitrogen conduit 52.

During the desorption phase of the adsorption column 1a there is affected in the adsorption column 1b the adsorption for the further nitrogen-krypton gas mixture which streams in through the inlet 30. During the inflow of the gas mixture which is to be scavenged, there is closed a shutoff valve 37b which is arranged in a discharge conduit 38b, in a manner analogous to the adsorption column 1a. In the position of the reversing valve 35b as shown in FIG. 4, the gas mixture which is to be scavenged flows through a column connector 39b into the adsorption column 1b. When a three-way valve 33b is switched over after the adsorption of the gas constituents of nitrogen and krypton by the adsorption medium in the adsorption column, wherein the valve 33b is arranged in the conduit 32b upstream of the reversing valve 35b, and thereby is conducted out of a scavenging gas conduit 34b, with the shutoff valve 37b open, as scavenging gas helium through the adsorption column 1b, there initially flows scavenging gas carrying only nitrogen therewith through a column connector 36b out of the adsorption column 1b. During this phase, a three-way valve 40b at the end of the discharge conduit 38b is set in such a manner whereby the helium-nitrogen mixture is conveyed through a conduit 41b into the conduit 42, and thereby to the gas scrubber 43. When helium with desorbed krypton flows out of the discharge of the adsorption column 1b, then the three-way valve 40b is switched over and connected with a krypton conduit 44b. The helium-krypton mixture then, required by the membrane pump 46, flows through the krypton conduit 45 to the storage flask 47. In the storage flask 47, the krypton is separated or dissociated, as previously described.

The installation illustrated in FIG. 4 is operated in the same manner as the installation pursuant to FIG. 1. Also in this instance, subsequent to adsorption at under a rising gas pressure, there is initiated the desorption phase in the adsorption columns through opening of the shutoff valves 37a, 37b, whereby initially nitrogen, thereafter a scavenging gas-nitrogen mixture, and subsequently a scavenging gas-krypton mixture will flow out of the adsorption columns. The installation pursuant to FIG. 4 operates quasi-continually, whereby the adsorption columns are operated alternatingly adsorptively or desorptively. The obtained products are krypton and nitrogen. The helium scavenging gas is conveyed in a closed flow circuit.

When employing activated charcoal as the adsorption medium, at room temperature and 1 Atm pressure, with a flow velocity of helium constituting the scavenging gas of 10 m/sec relative to the unfilled cross-section of the adsorption column (so-called empty-tube velocity) there can be obtained for krypton and nitrogen median diffusing or traveling speeds of $V_{kr}=5$ cm/sec and $v_N=10$ cm/sec. For these values there is obtained a first approximation over the length L of the adsorption column, based on the above-indicated interrelationship:

$$L \geq \frac{L_0}{1 - \frac{V_{Kr}}{v_N}} \searrow L \geq \tfrac{1}{2} L_0.$$

Figure 5:
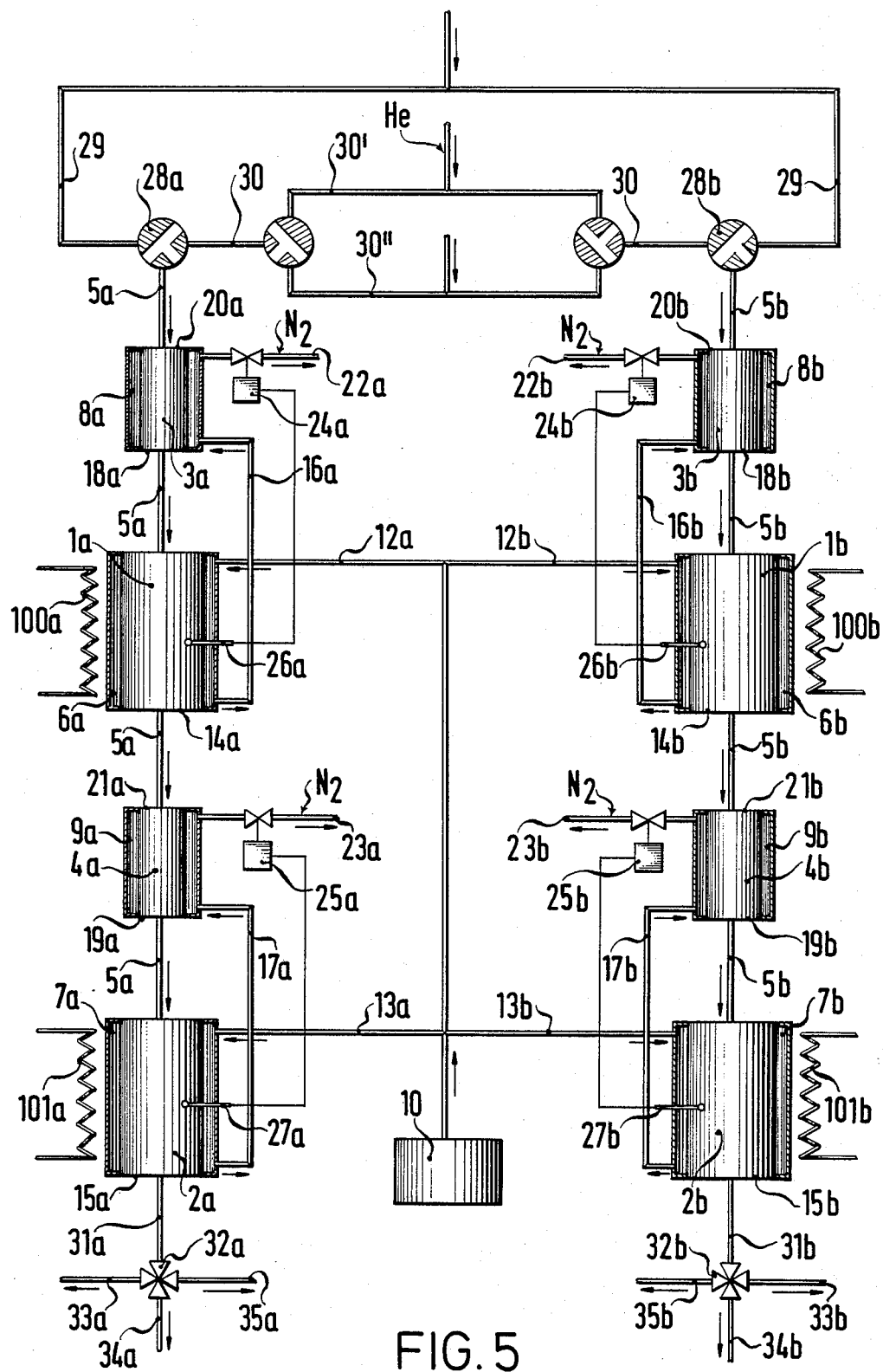
FIG. 5 schematically illustrates an installation for implementing the inventive process.

As can be ascertained from FIG. 5, there are provided for the installation two parallel-connected identically constructed adsorption operating lines a, b. The elements of the adsorption lines which always correspond with each other are designated in FIG. 5 by the same reference numerals, whereby the reference numerals designating the association of the elements with one adsorption line are, respectively, provided with suffixes a or b. Elements of the represented arrangement whose reference numerals are not provided with suffixes are located outside of the adsorption operating lines a, b.

The construction of an adsorption operating line is described hereinbelow on the basis of adsorption operating line a. Arranged within the adsorption operating line are two adsorption sections which are traversed in series by the gas mixture, and which, in the exemplary embodiment, are constituted of two series-connected adsorption columns 1a, 2a. However, deviating therefrom, the process can also be implemented in a single adsorption column, in which different temperatures can be set in part sections thereof. In the utilization of two separate adsorption columns, it is possible that the pre-scavenged gas mixture which flows out of the first adsorption section is cooled down prior to its entry into the second adsorption section. For this purpose, in the arrangement pursuant to the illustrated embodiment, a heat exchanger 3a, 4a, is connected upstream of the adsorption columns 1a, 2a for the precooling of the gas mixture. A gas conduit 5a connects the heat exchangers and the adsorption columns. The gas mixture which is to be scavenged or a scavenging medium flows through the gas conduit 5a in the same direction of flow through the adsorption operating line, where there is initially passed through the heat exchanger 3a and the adsorption column 1a, and thereafter the heat exchanger 4a and the adsorption column 2a.

The adsorption columns and heat exchangers can be cooled by means of a cooling medium, in the exemplary embodiment, through the intermediary of liquid nitrogen. The cooling medium hereby always flows through jacket spaces provided therefore in the adsorption columns and heat exchangers. The jacket spaces are identified in the drawing by reference numerals 6a, 7a, 8a, and 9a. The cooling medium flows through the jacket spaces 6a, 7a of the adsorption columns 1a, 2a in direct flow, and in the jacket spaces 8a, 9a of the heat exchangers 3a, 4a in counterflow to the gas mixture or scavenging medium. The cooling medium for both adsorption columns flows from a cooled supply container 10 through a central conduit 11 into the jacket spaces of the adsorption columns. Inlet conduits 12a, 13a are connected to the central conduit 11 for the adsorption line a, which connect into the jacket spaces 6a, 7a. From the outlet 14a, 15a of the adsorption columns, connecting conduits 16a, 17a lead to the jacket spaces 8a, 9a. The connecting conduits open into the jacket spaces 8a, 9a in the region of gas discharges 18a, 19a of the heat exchangers 3a, 4a. Thus, the cooling medium flows through the heat exchangers only subsequent to the cooling of the adsorption columns. The cooling medium is conducted off through cooling medium outlets 22a, 23a which are each connected to the gas inlet 20a, 21a of the heat exchangers 3a, 4a. In order to be able to conform the flow of cooling medium the desired temperature which is to be set in the adsorption columns, flow regulators 24a, 25a are arranged in the cooling medium outlets 22a, 23a, which are in operative connection with temperature sensors 26a, 27a. By means of the temperature sensors, which are located in the jacketted region of the adsorption columns, there is measured a reference temperature for the actual temperature in the adsorption medium with the adsorption columns.

The gas conduit 5a is connected to a three-way valve 28a upstream of the gas inlet 28a of the first heat exchanger 3a, by means of which there can be introduced either the gas mixture which is to be scavenged from a central gas mixture conduit 29 for both adsorption operating lines a, b, or scavenging medium from similarly central scavenging medium conduits 30 for helium (scavenging conduit 30') and air (scavenging conduit 30''), alternatingly into the adsorption operating lines a, b.

A gas conduit 31a conducts the gases from the gas discharge 15a of the second adsorption column 2a, which flow off from the adsorption line a during the adsorption phase or during desorption. The gas conduit 31a is connectable by means of a valve system 32a, which is only schematically illustrated in the drawing, with either a waste gas conduit 33a for the scavenged gas mixture, or with a krypton conduit 34a, or with a xenon conduit 35a. In the krypton conduit and in the xenon conduit, the scavenging medium flows off together with either the recovered krypton or xenon. The krypton and xenon can be separated from the scavenging medium, for example, by being frozen out therefrom. The arrangements required for this purpose are not illustrated in the drawing. Through the waste gas conduit 33a there accordingly flow the air constituents which have been obtained during adsorption, as well as those which have been separated out during desorption as the first gas constituents.

The adsorption lines a, b are operated alternatively, wherein one of the adsorption operating lines is presently operated in an adsorbing phase, while the other adsorption operating line operated in a desorbing phase. Obtained thereby is a quasi-continual separation of xenon and krypton from the gas mixture which is to be scavenged.

In the exemplary embodiment, the adsorption columns are each constituted of a copper tube which is encompassed by a cooling jacket, and which tube is filled with activated charcoal forming the adsorption medium. An activated charcoal was employed which is usual for gas chromatographs. The copper tube possessed an internal diameters $d_f$ of 3.5 cm, and a length L of 52 cm. The adsorption columns were cooled with liquid nitrogen, and could be heated by means of an electrical jacket heater 100a, 100b, 101a, and 101b. The heat exchangers consisted of a twin tube, into the annulus of which there could be introduced liquid nitrogen.

Introduced into the adsorption column as the gas mixture was air containing 0.1% by volume of xenon and 0.01% by volume of krypton. The temperature in the adsorption medium in the first adsorption column was set to −130° C.; the temperature in the second adsorption column was set to −170° C. During the adsorption phase the gas throughput consisted of 1 standard cubic meter/hour. The adsorption columns were charged with xenon and krypton only over a partial length thereof so that, during desorption, there was achieved a separation or dissociation of the gas constituents.

After the passing through of a gas charge of 2 standard cubic meters, the infeed of gas mixture was terminated, and the adsorption columns were desorbed. Hereby, up to the complete desorption of krypton, there was scavenged with 1 liter of helium/min, and thereafter with air. The adsorption media were hereby heated. During the first desorption phase, the heating up rate consisted of 3.5° C. per minute. After reaching a temperature of −25° C. in the first adsorption column and −65° C. in the second adsorption column, the electrical jacket heating was switched off. At a further advancing flow of scavenging gas, and the therewith introduced heat, the temperature of the adsorption column rose still slightly higher. Immediately before the escape of krypton at the discharge of the second adsorption column, there was reached a temperature of −20° C. in the activated charcoal in the first adsorption column, and −50° C. in the second adsorption column.

After the complete desorption of krypton, scavenging was effected with air instead of helium. Hereby, the adsorption columns were heated up to 120° C. For xenon desorption, at already about 80° C. is there obtained an adequate diffusing or traveling speed in the adsorption medium.

Figure 6:
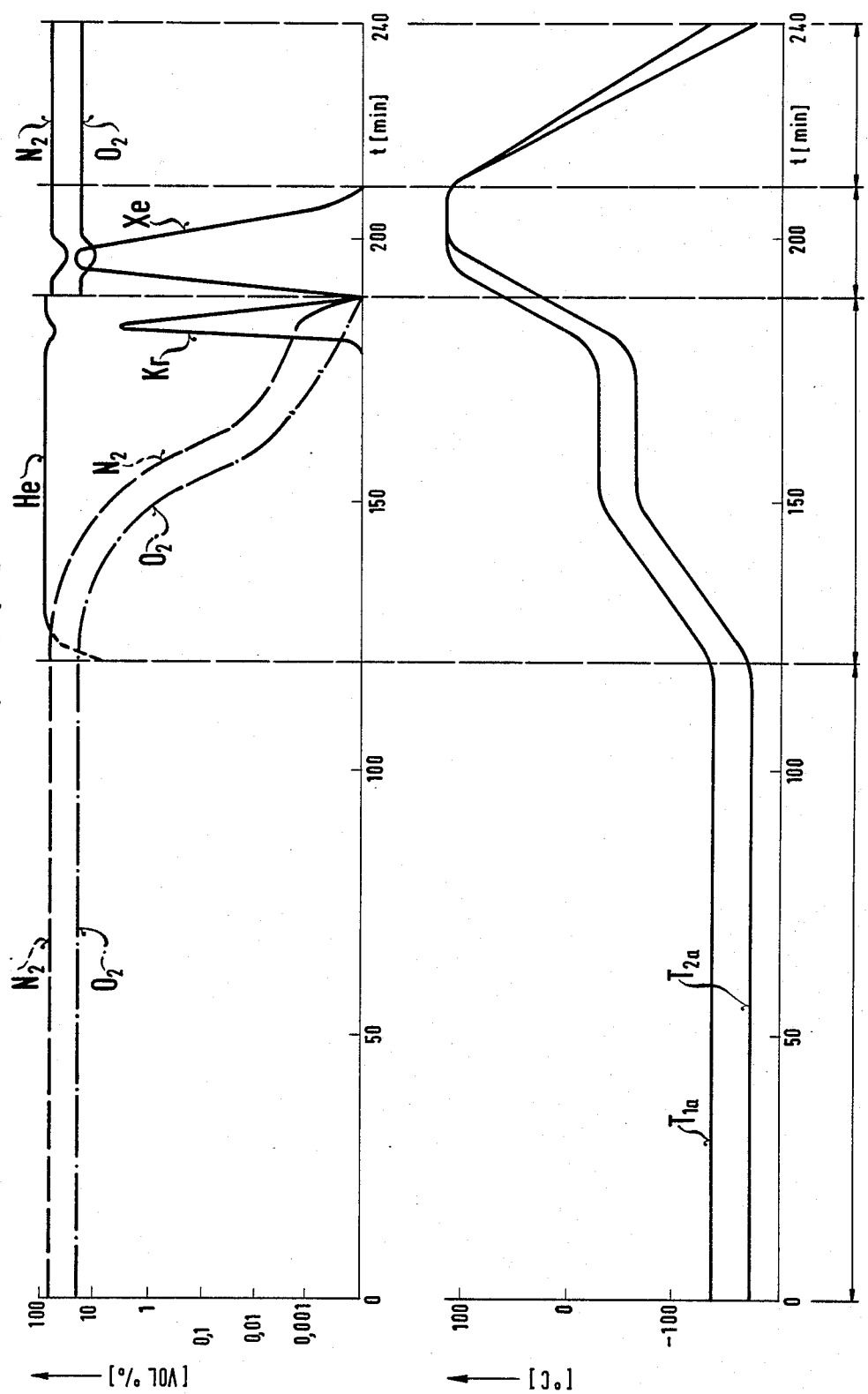
FIG. 6 illustrates a graphical representation of an adsorption-desorption operating cycle of an adsorption line pursuant to the arrangement of FIG. 1.

In FIG. 6 there is illustrated an operating diagram for an adsorption-desorption cycle of an adsorption operating line of the described arrangement. In the operating diagram there are set forth the gases flowing out of the gas discharge of the second adsorption column in dependence upon the operating period t in minutes, as well as the temperature range in the adsorptive medium of the adsorption columns (temperature in °C.), and also the concentration of the gas constituents of the gas (concentration in Vol. % in logarithmic scale).

As illustrated from the operating diagramm, during the adsorption phase, wherein within 2 hours 2 standard cubic meters of gas mixture (air; 0.1% by volume of xenon; 0.01% by volume of krypton) flow through the adsorption columns, the gas mixture at the gas discharge of the second adsorption column is constituted of approximately 80% by volume of nitrogen and approximately 20% by volume of oxygen. The temperatures $t_{1a}$, $t_{2a}$ in the adsorption columns $1a$, $2a$ during this absorption phase, as previously indicated, consist of, respectively, −120° C. and −170° C. Commencing from the beginning of the desorption phase the nitrogen and oxygen constituents drop off in the outflowing scavenging gas, it is scavenged with helium under a gradually increasing temperature in the adsorption columns. However, the temperatures $t_{1a}$, $t_{2a}$ initially do not exceed, respectively, −20° C. and −50° C. When krypton escapes at the gas discharge of the second adsorption column, the measurable concentrations in the air of the constituents nitrogen and oxygen are already extremely low. Beginning with the krypton escape, the adsorption columns are heated up (in the exemplary embodiment at a heating up rate of 9.2° C. per minute) to a final temperature of 120° C. When all of the krypton is desorbed, switched over is effected from helium to air scavenging, and xenon is conducted off with the air. Subsequently thereto, the adsorption columns are again cooled down to, respectively, −120° C. and −170° C. through an introduction of liquid nitrogen. The then completed adsorption-desorption cycle lasts a total of 4 hours.

Instead of cooling the first adsorption columns $1a$, $1b$ and the heat exchangers $3a$, $3b$ with liquid nitrogen, it is more economical that the scavenged air constituents flowing out of the gas discharge of the second adsorption columns $2a$, $2b$ during the adsorption phase be employed as cooling media for the above-mentioned aggregates of the adsorption operating lines. The scavenged air is then directly conducted through the gas conduits $33a$, $33b$ into the jacket spaces of the adsorption columns and heat exchangers.

What is claimed is:

1. In a process for the adsorptive separation of krypton from a gas mixture especially containing nitrogen in addition to the krypton, in an adsorption column, wherein the column is filled over a length L extending along the direction of the inflowing gas mixture with an adsorption medium which adsorbs krypton and nitrogen, and desorbed with a gaseous scavenging medium after adsorption of the gas constituents, scavenging medium flowing through the adsorption column in the same direction as the gas mixture and, said process consisting essentially of an adsorptive step and a desorptive step; the improvement comprising: filling in the adsorption medium through a gas inlet of the adsorption column commencing with krypton over only a partial length $L_O$ of the overall column length L whereby, during desorption of the adsorption column, there is separately withdrawable together with the scavenging medium from a gas discharge of the adsorption column initially only nitrogen, and subsequently krypton, said adsorption column being charged with said gas mixture with the gas discharge closed up to a predetermined gas pressure; the introduction of the gas mixture being blocked upon reaching said predetermined gas pressure; the desorption of said adsorption column being conducted at atmospheric pressure and with the gas discharge opened; and the scavenging gas containing nitrogen being conveyed from the gas discharge into a nitrogen conduit, and thereafter the scavenging gas containing krypton being conveyed into a krypton conduit.

2. A process as claimed in claim 1, comprising charging the adsorption column at room temperature.

3. A process as claimed in claim 1, comprising cooling said adsorption column during charging.

4. A process as claimed in claim 1, comprising effecting desorption with scavenging gas constituted of helium.

5. A process as claimed in claim 1, comprising interchanging the inlet and discharge of said column prior to renewed charging of the desorbed adsorption column.

* * * * *